INVENTORS
WILLIAM B. SAMPSON
BY RICHARD B. BRITTON
P. GERALD KRUGER
RICHARD A. BETH

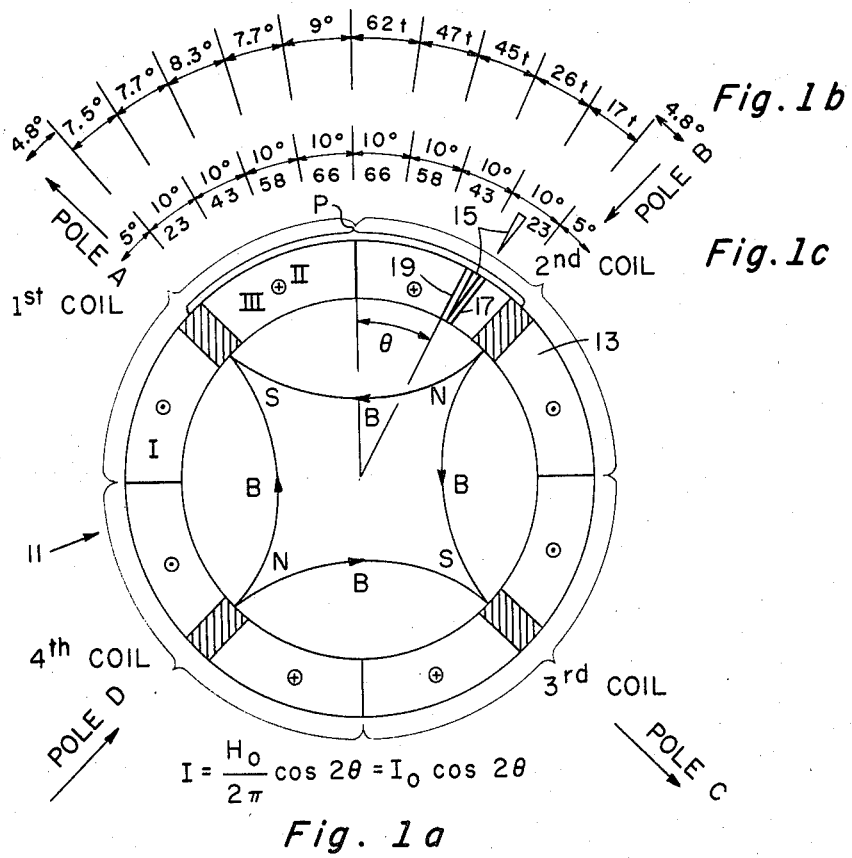
Fig. 1b
Fig. 1c
Fig. 1a
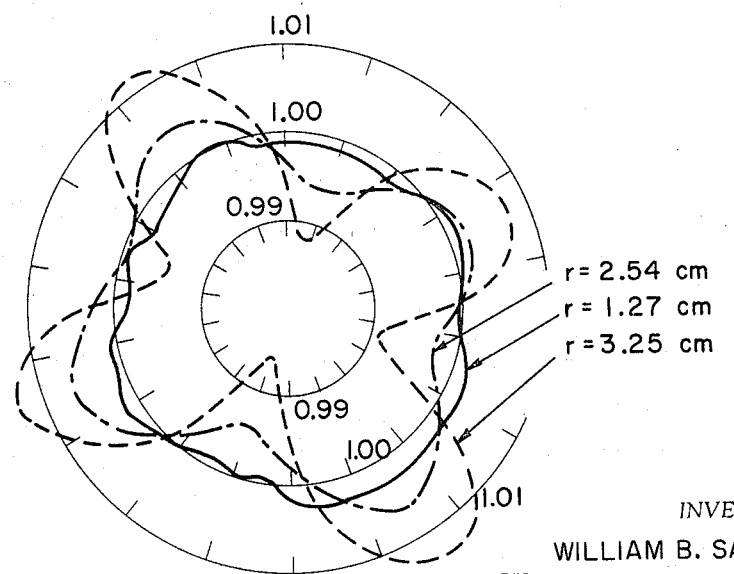
Fig. 6
INVENTORS
WILLIAM B. SAMPSON
RICHARD B. BRITTON
P GERALD KRUGER
RICHARD A. BETH
BY Jan. 21, 1969    W. B. SAMPSON ET AL    3,423,706
MULTIPOLE MAGNET HAVING A SEQUENTIALLY SHIM STEPPED COIL CONFIGURATION
Filed Oct. 28, 1966

INVENTORS
WILLIAM B. SAMPSON
RICHARD B. BRITTON
P. GERALD KRUGER
RICHARD A. BETH

United States Patent Office 3,423,706
Patented Jan. 21, 1969

3,423,706
MULTIPOLE MAGNET HAVING A SEQUENTIALLY SHIM STEPPED COIL CONFIGURATION
William B. Sampson, Bellport, and Richard B. Britton, Setauket, N.Y., and P Gerald Kruger, Champaign, Ill., and Richard A. Beth, Bellport, N.Y., asignors to the United States of America as represented by the United States Atomic Energy Commission
Filed Oct. 28, 1966, Ser. No. 591,056
U.S. Cl. 335—216                6 Claims
Int. Cl. H01f 7/22

ABSTRACT OF THE DISCLOSURE

Apparatus forming a magnetic field with $2n$ poles within a longitudinally extending aperture having longitudinally extending side-by-side, annular, conductive coils external to and forming said aperture.

---

This invention relates to multipole magnets for focusing charged particles in a beam. This invention was made in the course of, or under a contract with the U.S. Atomic Energy Commission.

Copending U.S. patent application Ser. No. 507,256, filed Nov. 15, 1965, by Sampson, Britton and Kruger, the coinventors of this application now U.S. Patent 3,356,976, describes a multipole magnet having a rectilinear system of current sheets, comprising electrically insulated, electrically conducting, superconducting ribbons arranged to form an open ended box. The superconducting operation of the ribbons consumes substantially little or no power, other than for the cooling system for the superconductors, so as to provide the advantage of low power consumption and low operating costs. The lack of iron therein avoids iron saturation effects, such as are present in conventional iron pole magnets. Additionally, the described copending curret sheet system provides high magnetic field gradients that are particularly useful and effective for high energy accelerators and beam transport systems wherein the higher the particle energy the higher the field gradients that are desired and/or required for cost considerations and efficiency. Since the copending system produces peak field regions at the corners of rectilineal aperture formed by the windings, however, these high field regions, which are not in the useable aperture, nevertheless determine the maximum current of the magnet due to the limiting relationship in superconductors between current density vs. field and the resulting gradient limit.

It has now been discovered in accordance with this invention, that a multipole magnet can be provided with curvilinear current sheets forming a curvilinear aperture wherein the useful aperture space is fully and effectively utilized without the degrading effect of high corner fields. These curvilinear current sheets, for example, are right circular cylinders, right elliptical cylinders and conic surfaces, etc. More particularly, the current sheets are coils arranged between two uniformally spaced surfaces. In another aspect, this invention provides conductors that are sequentially shim stepped around a cylindrical aperture in a current sheet that substantially approximates a smoothly varying current sheet function. In one embodiment, this invention provides longitudinally extending, annular coils arranged in side-by-side relation to form a cylindrical aperture with uniform, coaxial inside and outside diameters, substantially uniform internal magnetic field gradients, substantially uniform end magnetic field configurations, and $2n$ poles parallel with the axes in respective of said coil annuli, and at right angles to the axis of said aperture. With the proper selection of conductors and coil configurations, as described in more detail hereinafter, quadrupole field gradients up to 10 k.g. per cm. of radius can be obtained.

It is thus an object of this invention to provide a multipolar lens focusing system in which the lens provides cylindrical current sheets;

It is another object to provide means for producing a curret sheet flowing along and completely in the elements of a right circular cylinder;

It is another object to provide high quadrupole field gradients, e.g., up to 10 kg. per cm. or higher;

It is another object to reduce by up to half or more the superconductor requirements for a high magnetic field gradient magnet by providing sequentially stepped conductors laid on the surface of a cylinder;

It is another object to provide multipole, magnet windings with efficient and practical means for resisting the tendency of the magnet windings to expand radially outward when energized;

It is another object to provide iron coreless multipole magnets from ribbons having uniform internal and substantially uniform end field distributions;

Still another object of this invention is provision for efficiently focusing high energy charged particle beams in small and large apertures.

The above and further novel features and objects of this invention will appear more fully from the following detailed description when the same is read in connection with the accompanying drawings. It is to be expressly understood, however, that the drawings are not intended as a definition of the invention but are for the purpose of illustration only.

In the drawings where like elements are referenced alike:

FIG. 1a is a partial schematic illustration of the principles involved in this invention;

FIG. 1b is a diagrammatic illustration of an example of a quadrupole magnet of this invention according to the principles of FIG. 1a;

FIG. 1c is a diagrammatic illustration of another example of a quadrupole magnet of this invention according to the principles of FIG. 1a;

FIG. 2 is a partial three-dimensional view of a practical magnetic lens element embodying the principles of this invention illustrated in FIG. 1a;

FIG. 6 is a partial graphic illustration of the normalized field pattern at various radii of the quadrupole magnet of FIG. 2;

Figure 3:
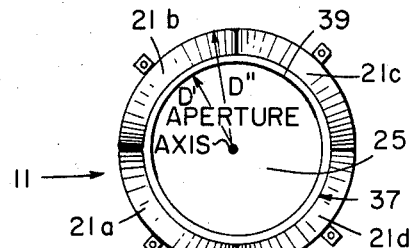
FIG. 3 is a partial three-dimensional end view of the magnet of FIG. 2.

The quadrupole magnetic field system of this invention is useful in charged particle accelerators, requiring the strong focusing effect of alternating gradients, such as in charged particle accelerators having energies up to 200 bev. or more. Likewise the multipole magnet of this invention is useful in beam transport systems or other systems wherein charged particles are transported, produced, used, focused, or otherwise handled. The system of this invention may be used to produce constant and/or pulsed magnetic fields.

A cylindrical current sheet is by definition the surface traced by a straight line moving parallel to a fixed straight line and intersecting a fixed curve. Each position of the moving straight line is an element of the cylinder. We thus call a cylinder in which current flows only along the elements (not transverse to them) a "cylindrical current sheet," comprising current filament elements. The resulting magnetic field is two-dimensional, or planar, since it varies only with coordinates transverse to the elements and not with distance parallel to the elements.

The complex potential due to a filamentary current $I$ abamperes perpendicular to the $Z=X+iY$ plane at $Z=z$ is an analytic function of $Z$: $W(Z)=2I \log (Z-z) + \text{constant}$. We use the capital $Z$ for field points and lower case $z$ for source (current) points. The complex logarithm is multiple-valued; therefore, the value of $W(Z)$ increases by $2I \times 2\pi i = 4\pi i I$ when $Z$ moves in any closed path once around the current $I$ in a clockwise direction. A detailed discussion of this complex representation is given on pages 2568–2569 of the Journal of Applied Physics, vol. 37, number 7, June 1966.

The same mathematical fact can be expressed in terms of the complex field strength H due to the current filament, namely $$H(Z) = \frac{dW}{dZ} = H_Y + iH_X$$

By the Cauchy Integral Formula H(Z) taken clockwise around any path enclosing $Z=z$ is $$\oint H(Z)dZ = \oint \frac{2I}{Z-z}dZ = 4\pi i I \quad (1)$$

Here 2I appears as the "residue" of H(Z) at $Z=z$. The relation (1) above contains the physical fact that the line integral of magnetic field strength along a closed path around the current $I$ is $4\pi I$. A detailed discussion of the current sheet theorum and its application to circular cylinders is given in Brookhaven National Laboratory report AADD–102, dated Mar. 25, 1966 and published in BNL Report 10148 in May 1966.

The necessary shape and current distribution for current sheets that will give a perfect quadrupole field has been determined, and for a current sheet of infinitesimal thickness and a cylindrical geometry of radius $r_0$, the total current between $\theta_0 = \pi/4$ and $\theta$ is given by $$I = \frac{B_0}{2\pi} \cos (2\theta)$$

and $B_0 = 2\pi I_0$. Therefore, $I = I_0 \cos (2\theta)$ where $I_0$ is the value of $I$ at $r=r_0$ and $\theta=0$. Here, I=the total current between $$-\frac{\pi}{4}$$

and $\theta$ and I=abamperes per centimenter, B=magnetic field in gauss, and $r_0$=radius of the inside of a cylinder. In one example, the poles are at 0°, 90°, 180° and 270°. (abampere=10 amps).

Referring to FIG. 1a, for illustrating this invention, $\theta=45°$ corresponds to the position of an equivalent magnetic pole of a quadrupole magnet. For $B_0$ in gauss, $I_0$ is in abamperes per centimeter. Similarly all $2n$ pole magnets may be produced by a similar arrangement where $I_0 = I_0 \cos n\theta$ where $2n$ is the number of poles. This is the general formula for multipole magnets, in accordance with this invention. The particular formula for quadrupole magnets is $$I_0 = I_0 \cos 2\theta \quad (2)$$

An actual quadrupole constructed in accordance with these specifications, whose partial schematic cross-section is illustrated in FIG. 1a, is about 20 cm. in overall length and wound with 1.27 cm. wide copper-clad $Nb_3Sn$ strip. The illustration is not representative of actual size relationship for ease of explanation. Anodized aluminum shims, such as the enlarged shim 15 that is shown for ease of explanation, are inserted between the turns of superconducting ribbon, for example turns 17 and 19, to provide or substantially approximate the current distribution $I = I_0 \cos (2\theta)$.

As shown in FIG. 1a, which is a cross-section through four adjacent coils of ribbon, the coils form a cylindrical, para-axial current sheet external to a longitudinally extending aperture formed by the current sheet. In this illustration, the current sheet 13 consists entirely of the four coils and the current sheet and coils form a cylindrical current sheet having coaxial inside and outside diameters that are uniformly spaced apart.

The first coil (and each of the other coils) has two oppositely directed sides. For ease of explanation the first coil is described, therefore, as having opposite sides I and II having opposite looped ends forming an endless race-track and inside thereof an annulus III. Since sides I and II are alike (although they have oppositely directed current), side II will be described. Side II has a sequentially stepped, turn configuration, i.e., shims like shim 15 are placed between the coil turns of superconducting ribbon and the turns are set up in steps with the number of turns and shims in the steps being determined by Formula 2.

In one example, illustrated in FIG. 1b, starting at 4.8° of arc from a first south pole A (i.e., 4.8° from the midpoint of annulus III) and moving in a clockwise direction, the first step in side II of the first coil comprising 7.5° of arc has 17 turns of ribbon therein; the second step, comprising 7.7° of arc has 26 turns of ribbon therein; the third step, comprising 8.3° of arc has 45 turns of ribbon therein; the fourth step, comprising 7.7° of arc has 47 turns of ribbon therein; and the fifth step, comprising 9° of arc has 62 turns of ribbon therein.

This sequence is repeated in reverse in the next adjacent side of an adjacent second coil from there to the north pole B as the steps continue in clockwise direction. Thus, the steps therein are 9° with 62 turns, 7.7° with 47 turns, 8.3° with 45 turns, 7.7° with 26 turns and 7.5° with 17 turns to a point 4.8° from the north pole B. This described 90° portion P of the current sheet 13 from pole A to pole B, comprises one half of one coil and one half of an adjacent coil, with the current direction into the paper plane as shown by $\oplus$. All turns are energized equally in series.

The next 90° of arc of current sheet 13 from this north pole B to the next adjacent south pole C is like the above-described 90° but with the current direction reversed as shown by the symbol $\odot$ to indicate current directions out of the paper plane. Likewise the next 90° of arc from south pole C to north pole D and the next 90° of arc from north pole D to south pole A are like the first and second described 90° of arc from south pole A to north pole B and from north pole B to south pole C with the respective current directions therein as shown by the symbols $\oplus$ and $\odot$.

Suitable thickness shims are disposed in each step described and the thicknesses of the shims (while equal in each respective step) increase and decrease from step to step sequentially from one pole to the next adjacent pole. Thus the shims in the 7.5° step have a first thickness and the shims have decreasing second, third, fourth and fifth thicknesses from step to step through the 7.7° step, the 8.3° step and the 7.7° step to the 9° step. Each respective succeeding step comprising 7.5°, 8.3°, and 9° of arc advantageously has the appropriate number and thickness of shims therein and moving clockwise, the number of shims in the 7.7° steps correspond with the number of turns therein whereby the 7.7° steps having 17 turns has thicker shims than the 7.7° step having 47 turns.

The Nb₃Sn ribbon used in this example is 1.3 cm. wide by .010 cm. thick positioned to equal or to approximate $I_o = I_0 \cos 2\theta$. The inside diameter of this quadrupole is a uniform 7.7 cm. and the outside diameter thereof is coaxial therewith and a uniform 10.2 cm. In this case, the ribbon length is 8,000 centimeters for coils of overall length of about 20–21 cm. around an aperture of like length.

Measurements have been taken of the magnetic field B as one rotates a probe, such as Bismuth fiber magnetoresistance probe, about the axis of the cylindrical quadrupole and at various radii from the axis. For the perfectly constructed quadrupole the magnitude of B remains constant at constant radius while the direction of the field varies. FIG. 6 shows actual results of such measurement. It can be seen that in actual practice the deviations from constant field remain substantially the same in shape with only a slight tendency toward a slight increase in strength as the radius increases. These small deviations correspond to the deviation of the current distribution initially chosen for cos 2θ and computer calculations, indicate that these deviations can very closely approach the ideal of less than 1% at maximum aperture by adjusting the shim thickness, the turns per step section, and the degrees per step section.

The angular sections (Δθ) can be as described and indicated in FIG. 1a, but the number of turns and the angular section steps can be adjusted with different numbers of turns and degrees of arc in the steps so that, in the current sheet formed thereby, $I_o = I_0 \cos (2\theta)$ is substantially approximated. Thus the step intervals of the steps may be any Δθ if the proper number of turns per unit angle is used. Therefore, in another example illustrated in FIG. 1c, which actually achieves low deviation, there are nine 10° arc steps in each of four coil sections of the magnet. Each pole section is formed respectively by two sides of a coil with the zero current density being in the middle of each section and with the zero current section in each of the four coils being 10° of arc in width.

Starting adjacent the annulus, with a 23 turn 10° step having thick shims, the normal resistance coated superconducting ribbon being 4 mils thick, the remaining three 10° steps of each side of each of the four coils comprise 43 turns, 58 turns (shimmed appropriately) and 66 turns without shims to fit the 10° of arc in each step.

The shim thickness is determined so as to achieve the highest density of turn packing in each step, i.e., the densest packing possible is determined by the density of turns achievable in the nonshimmed 10° step and the prior steps are then shimmed accordingly to produce the $I_o = I_0 \cos 2\theta$ current distribution. Wedge shaped shims 15 are used with the pointed end of the wedges pointed inwardly toward the center of the magnet and the insulated superconducting ribbon turns butting on the inside diameter of the magnet.

In a full scale lens with 10° steps, known as Model 4–24, which is one of a pair relatively rotated 90° to provide an alternating gradient focusing system, each lens is 4 in. (10 cm.) in inside diameter and 24 in. (60 cm.) long. This means that the effective length of the current conductor is considered to be 24 inches long. In addition to this first layer of one-half inch wide current conductor, calculations also have been made for a second layer, wound on top of the first layer and having an inside diameter of 5.25 in. A combination of the results of the calculations for the first and second layers will give the magnetic field characteristics for such a two-layer superconducting quadrupole lens.

Details of the number of turns of one-half inch wide ribbon per Δθ interval are given in the following Table I.

TABLE I.—CURRENT DISTRIBUTION IN MODEL 4-24 SUPERCONDUCTING QUADRUPOLE

[The number of turns of ½ inch wide Nb₃Sn are given as functions of θ and Δθ]

| θ | Δθ (degrees) | Number of turns per Δθ, first layer | Number of turns per Δθ, second layer |
| --- | --- | --- | --- |
| 10 | 10 | 100 | 131 |
| 20 | 10 | 88 | 115 |
| 30 | 10 | 65 | 85 |
| 40 | 10 | 35 | 45 |
| 45 | 5 | 0 | 0 |
| 50 | 5 | 0 | 0 |
| 60 | 10 | 35 | 45 |
| 70 | 10 | 65 | 85 |
| 80 | 10 | 88 | 115 |
| 90 | 10 | 100 | 131 |
| Total | | 576 | 752 |

These represent the current distribution, found by digital calculation, to give the closest approximation to $I = I_0 \cos 2\theta$, for the total number of turns involved. The number of turns in the first 10°, Δθ interval is deduced by dividing the arc for a Δθ=10° by the nominal strip thickness, namely 0.004″. The approximate number of turns per Δθ for other Δθ's is proportional to Δ[sin 2θ]. Thereafter the computations must decide the "best" distribution.

Figure 8:
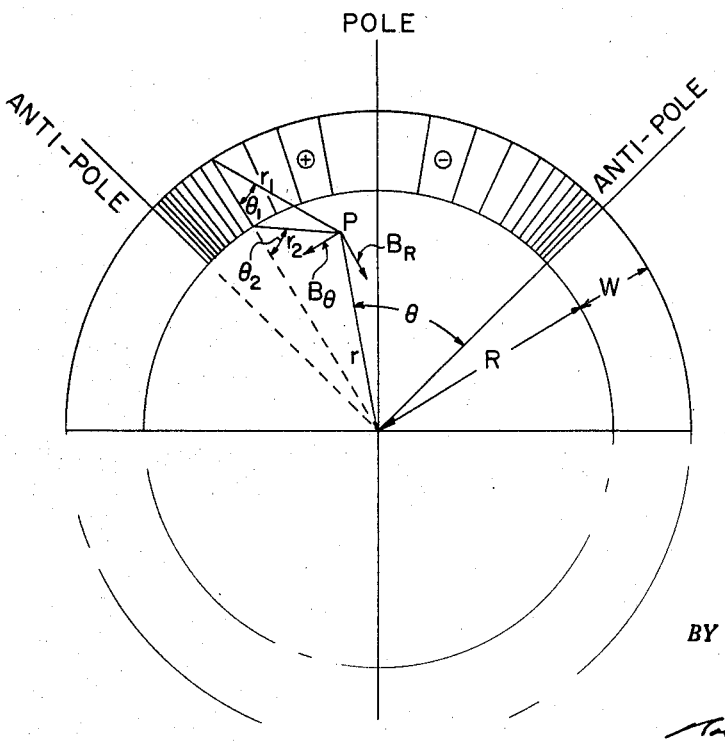
FIG. 8 is a schematic representation for calculating parameters for a superconducting quadrupole in accordance with this invention.

The digital computing program calculates the magnetic field components, $B_R$ and $B_\theta$ as well as the total magnetic field at a point P, which is at some constant radius r, as shown in FIG. 8 and as a function of the azimuthal angle θ. The magnetic field components are given by:

$$B_R = k\rho(\theta_2 - \theta_1)$$

$$B_\theta = k\rho \ln(r_2/r_1)$$

where $k = \sin \beta_1 + \sin \beta_2$ and β is the angle usually specified in the derivation of the field owing to a long straight wire and resulting in the equation, $$B = \frac{i}{r_1} (\sin \beta_1 + \sin \beta_2)$$

ρ is the current (in emu./cm.) in the strip, along with the width w. The other quantities are as depicted in FIG. 8. $B_\theta$ is perpendicular to the plane of the current strip and $B_R$ is parallel to the plane of the current strip.

The computer calculates the components $B_\theta$ and $B_R$ at the point P owing to each current strip (e.g., 2304 strips in the first layer) around the circumference of the quadrupole, takes the vector sum of these components and finally calculates the resultant magnetic field.

Assumptions or conditions which are implicit or explicit to the calculations are:

(a) The current strip is 24 in. long and no end effects are included in the calculation. The finite length is taken into account.

(b) The one-half inch width of the current strip is radial and is positioned uniformly in any particular interval Δθ=10° so that each current strip is separated by an angle interval equal to 10° divided by the number of strips in that angle interval.

(c) The current distribution in the strip is uniform.

Figure 9:
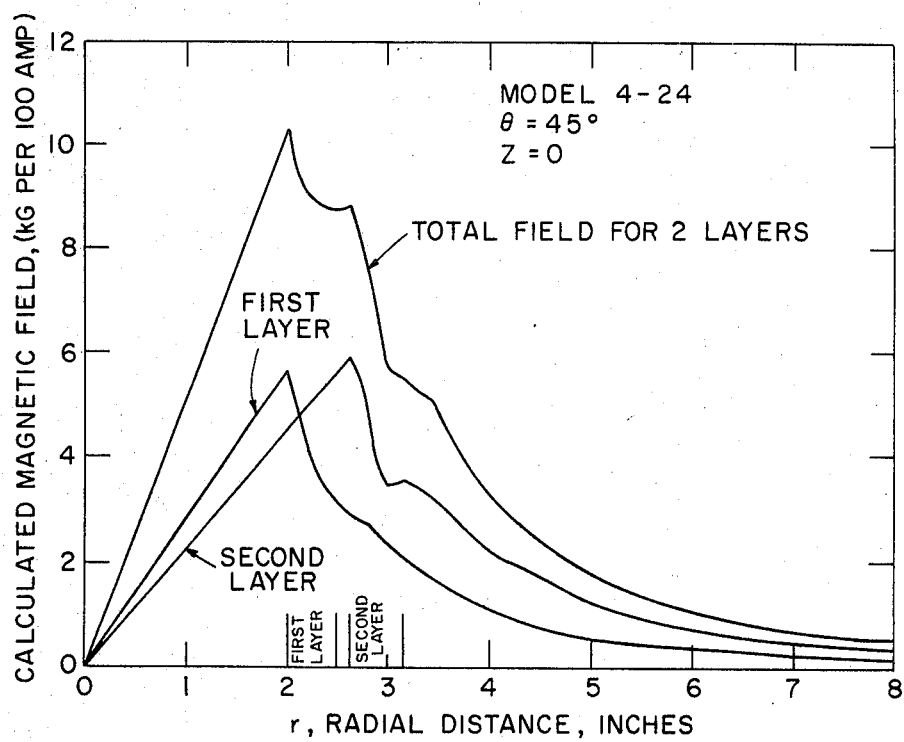
FIG. 9 is a graphic illustration of magnetic field vs. radial distance for the Model 4–24 quadrupole of this invention.

FIGURE 9 gives the results of the calculation of B, the magnetic field is in kilogauss per 100 ampere current in the strip, vs. r, the radial distance (inches) from the axis of the quadrupole. The data are given at θ=45°, which from FIG. 1 is seen to be a pole of the quadrupole. Z is the distance along the axis of the quadrupole, measured from the center of the quadrupole, and for these data Z=0.

The numerical values obtained from digital calculations and from which FIG. 9 is plotted show that dB/dr is constant to less than 0.07% for r<2 in. This provides good lens quality. dB/dr=10 kg./cm. for the two layers, assuming I=500 amperes for the two layers and I=660 amperes for one layer alone as seems reasonable from actual tests.

Assuming a conservative $dB/dr=7.0$ kg./cm. for a one layer lens, the length of the lens 60 cm., the distance between the ends of two identical lenses in a lens system 25 cm., and particles of momentum 30 Bev./c., then the approximate focal length of such a system would be about 8.7 meters. However, if each lens had two layers of $Nb_3Sn$ the focal length of the lens system would be 4.3 meters.

Data from FIG. 9 allows one to make an estimate of the energy stored in the magnetic field of the system. For one full-scale lens with 660 amperes in one layer of $Nb_3Sn$ this is found to be about 35 kilojoules, so that a two-lens system would have about 70 kilojoules of stored energy. Correspondingly, a full-scale two-lens system with each lens having two layers of $Nb_3Sn$ and 500 amperes, the total stored energy would be about 220 kilojoules.

It may also be noted from FIG. 9 that 8 inches from the axis of the lens the magnetic field is down to 130 gauss per 100 ampere current in the coil. Thus at 660 amperes the fringing field at this point would be 860 gauss, the fringing field decreasing as the distance increases from the axis of the lens illustrated in FIG. 9.

Figure 2:
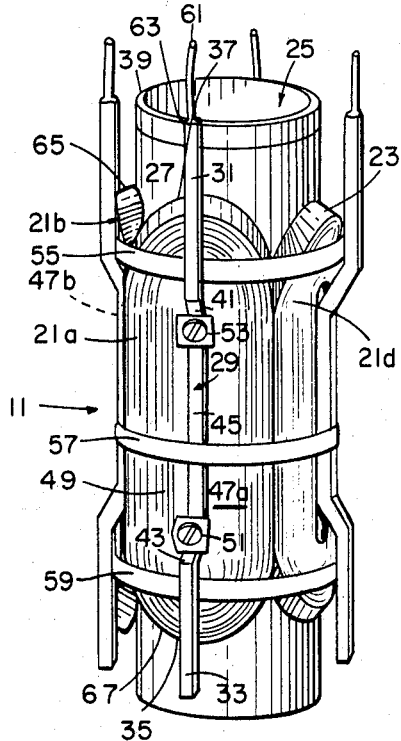

A practical arrangement for accomplishing the desired magnet having a desired high magnetic field gradient, is illustrated in FIG. 2. Shown there is an arrangement of four coils of superconducting ribbon 23 that form an annulus 25 extending radially around a circular right cylindrical aperture 27 formed by tube 39. Cleats 29, advantageously made of copper, have two opposite arms 31 and 33 that hold the opposite ends 35 and 37 of each coil interposed between the cleat arms and central, circular, right-cylindrical, nonmagnetic tube 39. To this end the cleat arms 31 and 33 parallel the longitudinally extending elements of tube 39 and its axis and are offset with jags at elbows 41 and 43 connected longitudinally to extend into the central post 45 in the oblong recess formed by the race track shaped configuration in each coil. Post 45 also parallels the longitudinally extending outside of tube 39 and its axis and screws 51 and 53 screw through post 45 into the outside of tube 39. The cleats thus maintain the coils against deformation while the outsides of the individual coils also interact cooperatively therewith to this end. This cooperative arrangement is shown in FIG. 3 where it is seen that the outside diameter D" of the coils is coaxial with the inside diameter D' thereof and the inside diameter D' of each coil assembly 21 butts up against the arcuate shape of the outside diameter of tube 39 and forms the circular right cylindrical shape of aperture 27, which is coaxial with the described uniformly spaced inside and outside diameters of the coils relative to the axis of aperture 27.

The cleats 29 also resist the tendency of the coils to expand due to the magnetic field created thereby in aperture 27. Three stainless steel straps 55, 57 and 59 also encircle the coils coaxially with the outside diameter of tube 39 to resist the tendency of the coils to expand radially outward away from the axis of tube 39 when the coils are energized to produce a magnetic field in aperture 27. A perforated stainless steel sleeve (not shown) may be used also or in the alternative to resist this expansion of coils 21.

The coils assembly 21 is energized by a simple, efficient system to provide a uniform field gradient in aperture 27. To this end a superconducting lead 61 conects between a suitable high current constant, or pulse electrical energy source, and end 63 of arm 31. The lead 61 follows along the bottom of arm 31, elbow 41 and post 45 to the inside of the recess, referred to hereinafter as recess 47A for ease of explanation, formed by one coil, referred to hereinafter for ease of explanation as coil 21A. The current conduction path then spirals outward from the center and around the first coil 21A to the outside thereof where it connects by soldering, or continuously, with the outside turn 65 of the second coil 21B, which is directed in the same direction as the adjacent outside turn 67 of coil 21A. Thereupon, the current conduction path spirals inwardly to the center recess 47B of coil 21B. It thus will be apparent that the opposite sides of each respective coil provide oppositely directed current paths. This is also illustrated in FIG. 1a where $\oplus$ indicates curent paths into the paper and $\odot$ indicates current paths out of the paper at right angles to plane thereof.

The south pole A of magnet 11, therefore, is in between the opposite sides of one coil, for example, coil 21A in its recess 47A and parallel with the axis of recess 47A at right angles to the axis of aperture 27. Likewise the north pole B of magnet 11 is in between the opposite sides of adjacent coil 21B for example, in recess 47B, parallel with the axis of recess 47B and also at right angles to the axis of aperture 27. As understood in more detail hereinafter two like sets of adjacent coils, namely set 21A and 21B and a set of third and fourth coils 21C and 21D produce the quadrupole field illustrated in FIG. 1a. Coils 21a, 21b, 21c and 21d of FIGS. 2 and 3 correspond respectively with coils 1, 2, 3 and 4 in FIG. 1a from which it will be understood that the poles are at right angles to the axis of the aperture 27 and parallel to the axes of their coil apertures.

Coils 21C and 21D are connected in series circuit to the inside of coil 21B and the source to produce the quadrupole field illustrated in FIG. 1a. To this end the end of the inside turn of coil 21B is connected to the outside adjacent turn of coil 21C by a lead. This and like connections however, may be eliminated by a continuously wound system of coils 21A, 21B, 21C and 21D. The ribbon of coil 21C winds outwardly from the center of aperture 47D, which is oppositely, symmetrically disposed on tube 39 to coil 21B. The end of the ribbon turns in coil 21D follows the bottom of its cleat 29 to the above-mentioned electrical energy source to complete the circuit therethrough and through coils 21A, 21B, 21C and 21D.

The cryogenic system comprises a conventional dewar or other insulated box forming a container with tube 39, in which a cryogenic fluid is contained and circulated by means of suitable pumps and pipes. An epoxy box or other container, as described in the cited copending application, which is assigned to the assignee of this invention, may also be used. Suitable switches are also provided, as described in the cited copending application, or as is conventional to maintain a superconducting circuit in the described series connected coils, and to energize the coils from a suitable source. Suitable normal resistance to superconductor connectors, such as described in U.S. Patent 3,263,193, may be used.

To produce a magnetic field with a constant gradient G suitable for the Brookhaven National Laboratory Alternating Gradient Synchrotron, with a field $B=10,000$ gauss and $G/B=0.0425$ cm., the source provides a linear current density $(\theta)=15915 \cos \theta + 6088 \cos (2\theta)$ amperes/cm. of circumference on the surface of a circular cylinder of 9.0 cm. radius, with the maximum density at the antipoles of about 22,000 amperes/cm. In actual practice, 63,000 amperes/cm. of circumference in a block of ribbon 1.27 cm. in radial thickness has been achieved with a peak magnetic field at the inner diameter of the ribbon and at 41 kg., i.e., at the outside of annulus 25. It is noted, that each turn of ribbon conductor has uniform current flow across its radial width due to the uniform cross-section of the ribbon and the described disposition thereof.

Figure 4:
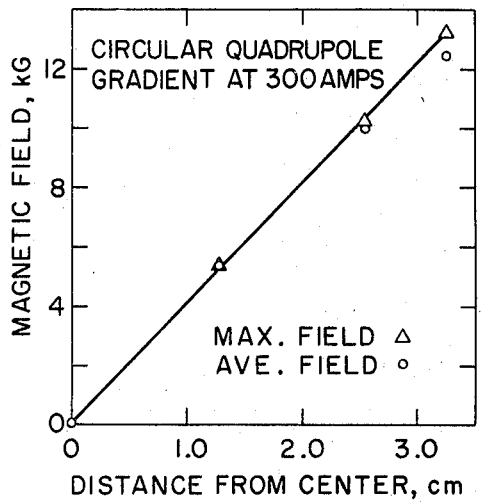
FIG. 4 is a graphic illustration of magnetic field vs. radial distance outward from the center of the circular aperture of the magnet of FIG. 3.

Referring to FIG. 4, the field produced by the magnet of FIG. 2 at 300 amperes is shown at various distances from the axis thereof. The gradient at 630 amperes per turn at inside and outside radii of 1.5 and 2 inches is 8.6 kg./cm., which is about three times the gradient obtained in conventional iron pole quadrupoles of this internal diameter. In fact, quadrupole fields of up to 10 kg. or more per cm. of radius have actually been achieved. Moreover, this gradient is achieved with superconducting ribbons, with about one-half the superconductor required for a like gradient and bore in the above described copending system. Gradients, moreover of up to 25 kg./cm. or higher have actually been achieved in opposed field superconducting magnets made of $Nb_3Sn$.

Figure 5:
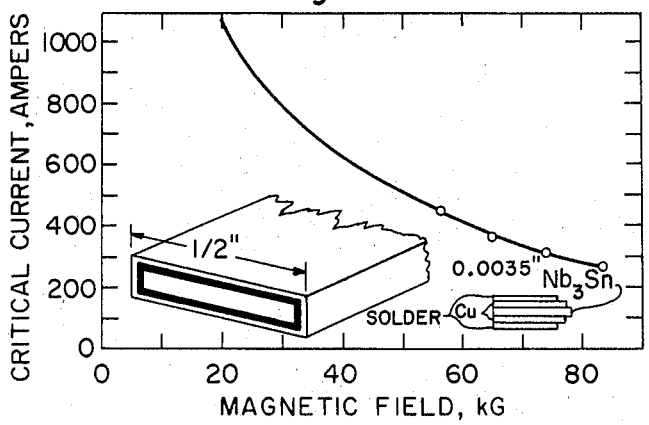
FIG. 5 is a partial graphic illustration of the superconductor of the magnet of FIG. 2 and critical current thereof vs. magnetic field.

The critical current of 630 amperes corresponds to a maximum field of 35 kg. in the windings and agrees reasonably well with the critical current values measured for small coils and short samples of similar materials, illustrated in FIG. 5.

One particular ribbon is illustrated in FIG. 5, where it is seen that the ribbon advantageously comprises rectangular cross-section $Nb_3Sn$ ribbon having a uniform rectangular copper coating thereon. The $Nb_3Sn$ ribbon is advantageous since it is commercially available and has a high current density relative to other superconductors. A complete laminated superconductor as shown is 0.010 cm. thick. While $Nb_3Sn$ ribbon have been preferred, other superconducting materials, such as NbZr, NbTi and $V_3Ga$, may be used.

Figure 7:
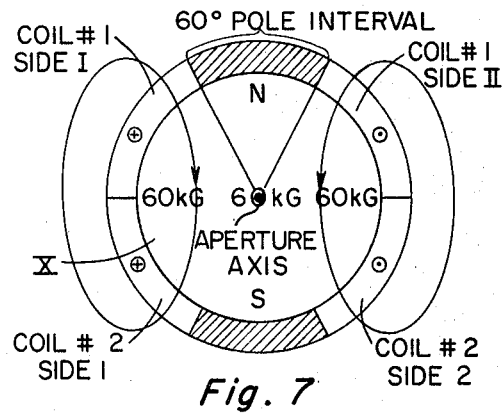
FIG. 7 is a partial cross-section of a dipole magnet, in accordance with the principles of this invention.

In another embodiment shown in FIG. 7, a dipole magnet is provided in accordance with this invention. In this embodiment also, shim stepped coils corresponding to 180° of arc on a cylindrical surface, are provided that approximate or produce the smoothly varying current sheet funtcion $I_0 = I_0 \cos \theta$. In the example shown, the aperture is circular in cross-section. The cross-section may be elliptical, conical, etc., with properly chosen current steps.

In an operating synchrotron, dipole, quadrupole and sextupoles made in accordance with this invention may be used. For example, two quadrupoles, which are identical but with their corresponding poles shifted relatively 90°, provide an alternating gradient or strong focusing pair in a straight section of a synchroton such as the AGS at Brookhaven National Laboratory. Suitable bending magnets bend the beam in an endless circulating path.

In another embodiment, the system of this invention can be applied to provide cylindrical current sheets and multipole magnet apertures of other than circular cross-section, such as in dipoles, quadrupoles, sextupoles, octupoles, etc., or combination thereof. Cylindrical aperture cross-section in accordance with this invention, for example, are ellipses.

In this regard, the above-described residue theorem is applied to the assemblage of current filaments comprising any section of a cylindrical current sheet. For example, let the filaments of which the sheet is composed be perpendicular to the Z plane along a curve $Z = z$ and let $\Delta I$ be the total current flowing upward in the interval from $z$ to $z + \Delta z$ on the curve. Then $$\oint H(Z)dZ = 4\pi i \Delta I$$

for any closed path enclosing $\Delta z$. If we deform the path toward $Z=z$ from both sides and use subscripts R and L to denote functions to the right and left of the curve, we obtain the "current sheet theorem"

$$H_R(z) - H_L(z) = \frac{4\pi dI}{dz}$$

where $H_R(Z)$ and $H_L(Z)$ are the limits of the analytic functions $H_R(Z)$ and $H_L(Z)$ as Z approaches $z$ from right and left respectively, and $dI/dz$ is written symbolically for the limit of $\Delta I/\Delta z$ as $\Delta z$ approaches 0 at any $z$.

To evaluate $dI/dz$, which is, in general, complex, it is convenient to express both $I=I(p)$ and $z=z(p)$ in terms of real parameter $p$ that increases monotonically along the curve. In general I is real and z is complex. If both functions are differentiable, $$\frac{dI}{dz} = \frac{dI/dz}{dp\sqrt{dp}}$$

noting that $I(p) - I(p_0)$ is the cumulative total current flowing in the sheet interval from $z(p_0)$ to $z(p)$, and the $|dI/dz|$ is the linear current density (abamperes/centimeter) in the sheet at $z$. An analysis for producing arbitrary fields by elliptical current sheets is given in the cited BNL report.

While the invention has been described with reference to multipole magnets having ribbon shaped conductors, the current sheet system of this invention can likewise be applied to cylindrical current sheets produced by conductors of any appropriate cross-section. For example, the conductors may be in cross-section, round, square, or wedge shaped. Advantageously, these conductors are superconductive, for example, $Nb_3Sn$ coated with a normal conductor such as copper, but insulated normal conductors may alternately be used.

Also, although this invention is applied primarily to two dimensional models, the concepts thereof may be applied to three dimensional models. Thus, the teachings of this invention may be applied to the helical model described and shown in U.S. Patent 2,736,799. Here, the magnet poles have a helical form wherein the coils have a helical twist around the axis of an aperture like aperture 27. Here also, the general formula $I_0 = I_0 \cos n\theta$ and the stated particular formulae apply to multipole magnets of cylindric form having $2n$ poles, such as dipoles, quadrupoles, sextupoles, octupoles, etc.

This invention has the advantage of providing a high magnetic field gradient, multipole magnet employing current sheets around cylindrical apertures that are fully and effectively utilized. Moreover, the superconducting, shim stepped, conductors of this invention provide uniform internal and substantially uniform end field configurations. Actual tests have shown the effectiveness of this invention in efficiently producing high quadrupole magnetic field gradients up to 10 kg./cm. or over. These high field gradients are particularly advantageous for charged particle beam transport and/or high energy accelerators wherein it is desirable to provide low power requirements and to eliminate iron pole saturation effects. Additionally, the superconductors employed are commercial items wherein the material required costs half or less of that necessary for a given field gradient in superconducting magnets known heretofore.

What is claimed is:

1. Apparatus forming a magnetic field with $2n$ poles within a longitudinally extending cylindrical aperture, comprising means consisting of a system of longitudinally extending, side-by-side, annular, conductive coils external to and forming said aperture, the annuli of said coils being parallel with the respective poles, said poles being at right angles to the axis of said aperture, and said coils being ribbons that are sequentially shim stepped around said aperture to approximate a smoothly varying current sheet function.

2. The invention of claim 1 in which said apparatus is a quadrupole magnet, comprising four adjacent coils of electrically insulated, electrically conducting, rectilinear cross-section ribbons forming a uniformly symmetrical, righ cylindrical aperture along an axis, said coils of ribbon formed in turns having sequentially, stepped, shim means therebetween for producing a substantially uniform quadrupole magnetic field gradient in said aperture, means for maintaining said symmetrical curvilinear configuration and resisting the tendency of said coils to expand radially outwardly from said aperture axis, and means for energizing said coils with uniform current density in said turns and having unidirectional energization in adjacent turns, unidirectional energiaztion in adjacent sides of adjacent coils, and opposite energization in opposite sides of each of said coils.

3. The invention of claim 1 in which said apparatus is a dipole magnet, comprising means consisting of a system of coils of ribbons forming cylindrical current sheets, the ribbons being sequentially shim stepped around a cylindrical aperture in accordance with the smoothly varying current sheet function $I_o = I_0 \cos \theta$.

4. The invention of claim 1 in which said apparatus is a multipole magnet, comprising means consisting of a system of coils of conductors forming curvilinear current sheets, the conductors being sequentially shim stepped around a curvilinear aperture in accordance with the smoothly varying current function $I_o = I_0 \cos \theta$.

5. The invention of claim 1 in which said apparatus, comprises $2n$, side-by-side, longitudinally extending, annular, conductive coils having parallel sides connected by end loops arranged around a cylindrical aperture formed by said coils.

6. The invention of claim 1 in which said apparatus, comprises $2n$, side-by-side longitudinally extending, annular, conductive coils having parallel sides connected by end loops arranged around a cylindrical aperture formed by said coils, said means having a uniform outside dimension co-axial with the outside diameter of said aperture.

References Cited
UNITED STATES PATENTS 3,008,044  11/1961  Buchhold _____ 250—49.5

FOREIGN PATENTS 1,437,489  3/1966  France.

GEORGE HARRIS, *Primary Examiner.*

U.S. Cl. X.R.

250—49.5; 335—213